United States Patent [19]

Itoh

[11] Patent Number: 5,301,265
[45] Date of Patent: Apr. 5, 1994

[54] APPARATUS FOR CONVERTING N PICTURE ELEMENTS TO M PICTURE ELEMENTS

[75] Inventor: Masaharu Itoh, Yamato, Japan

[73] Assignee: International Business Machines Corporation, Armonk, N.Y.

[21] Appl. No.: 924,701

[22] Filed: Aug. 4, 1992

Related U.S. Application Data

[63] Continuation of Ser. No. 493,091, Mar. 12, 1990.

[30] Foreign Application Priority Data

Mar. 15, 1989 [JP] Japan .................................. 1-60753

[51] Int. Cl.$^5$ .............................................. G06F 15/62
[52] U.S. Cl. .................................... 395/128; 395/133; 395/139; 395/164
[58] Field of Search .............................. 364/518–521; 395/128–132, 162–166, 133, 139

[56] References Cited

U.S. PATENT DOCUMENTS 4,967,378 10/1990 Rupel et al. .................... 364/521 X

*Primary Examiner*—Gary V. Harkcom
*Assistant Examiner*—Almis Jankus
*Attorney, Agent, or Firm*—Jack M. Arnold; Richard M. Ludwin

[57] ABSTRACT

In an initial set up sequence, N pels of an original image are stored in N memory positions of an input buffer. The N pels are converted to M pels, which are stored in M memory positions of an output buffer, where M and N are integers larger than 0. In the case of N<M, an enlargement of the original image is made, and in the case of N>M, a reduction of the original image is made. An address counter pointing to an address of a memory position of the input buffer is initially reset to 0. An address counter pointing to an address of the memory position of the output buffer is also reset to 0. The values −N, M, and an initial sum value S (where S is integer satisfying −N≦S<M) are initially stored in three registers, respectively. The initially stored sum value S is repeatedly updated to control the scaling up operations or the scaling down operations. There is a first device which determines or checks whether the sum value is negative, or not. The first device generates a first signal indicating that the sum value is not negative or a second signal indicating that the sum value is negative. A second device responds to the first signal to store or move the pel data in a memory position of the input buffer pointed to by the address counter into a memory position of the output buffer pointed to by the address counter, to update the sum value by adding the value −N to the sum value and to increment the address of memory position of the output buffer; and which responds to the second signal to update the sum value by adding the value M to the sum value, and to increment the address of the memory position of the input buffer. A control device is provided to repeatedly control the above operations until the M pels of the scaled image are formed.

2 Claims, 4 Drawing Sheets

APPARATUS FOR CONVERTING N PICTURE ELEMENTS TO M PICTURE ELEMENTS

This application is a continuation of U.S. Ser. No. 07/493,091, filed Mar. 12, 1990, now abandoned.

TECHNICAL FIELD

The invention relates to an apparatus and method for converting N picture elements (pels) of image to M pels (N and M are integers larger than 0).

BACKGROUND ART

The prior technology is classified into two groups. The first group uses a table which stores addresses of the pels of the original image. The addresses represent the pels of an original image which are selectively picked up to form a scaled down image or a reduced image. In an enlargement of the original image, the addresses are used which represent the pels of the original image which are used one time or plural times in accordance with a ratio of enlargement. An article "System for converting resolution," IBM Technical Disclosure Bulletin, Vol. 31, No. 6, November 1988, pp. 324–327 shows the example of the table for reducing the number of pels of the original image. The problem of this technology is that various tables must be prepared to adapt to the various scale ratios.

The second group uses an algorithm for scaling the original image without requiring the tables of the technology of the first group. A typical algorithm is Bresenham's algorithm which was described in the IBM Systems Journal, Vol. 4, No. 1, 1965. The Bresenham's algorithm is known as a line generator which is used for scaling up or down the image. The problem in the use of the Bresenham's line generator is that two Bresenham's line generator are required to perform both the scaling up and scaling down operations, and additional program steps for discriminating which operation is selected are required. The use of the two line generators increases the cost and decreases the performance of the operations.

Another typical algorithm is known as a digital differential analyzer (DDA). It is assumed that 50 pels are reduced or scaled down to 30 pels. First, a calculation $50/30 = 1.6666 \ldots$ is performed. It is assumed that the value 1.666 is used. The value 1.666 is stored in a register and the stored value is updated by repeatedly adding the value 1.666 to the stored value. The updated values are 1.666, 3.332, 4.998, 6.664, .... The integral part of the value is used as an address of the pel of the original image to be picked up to form the scaled down image. In this example, first, third, fourth, sixth pels, etc. of the original image are picked up to form the scaled down image. The problem of the DDA is that the DDA inherently generates an error due to the division, and the DDA requires a long calculation time, so that the performance of the DDA is quite low in comparison with the present invention.

DISCLOSURE OF THE INVENTION

In an initial set up sequence, N pels of an original image are stored in N memory positions of an input buffer. The N pels are converted to M pels, which are stored in M memory positions of an output buffer, where M and N are integers larger than 0. In the case of $N < M$, an enlargement of the original image is made, and in the case of $N > M$, a reduction of the original image is made. An address counter pointing to an address of a memory position of the input buffer is initially reset to 0. An address counter pointing to an address of the memory position of the output buffer is also reset to 0. The values $-N$, M, and an initial sum value S (S is integer satisfying $-N \leq S < M$) are initially stored in three registers, respectively. The initially stored sum value S is repeatedly updated to control the scaling up operations or the scaling down operations.

Means is provided, which determines or checks whether the sum value is negative, or not. The means generates a first signal indicating that the sum value is not negative or a second signal indicating that the sum value is negative. Means is provided, which responds to the first signal to store or move the pel data in a memory position of the input buffer pointed to by the address counter into a memory position of the output buffer pointed to by the address counter, to update the sum value by adding the value $-N$ to the sum value and to increment the address of memory position of the output buffer; and which responds to the second signal to update the sum value by adding the value M to the sum value, and to increment the address of memory position of the input buffer. A control means is provided to repeatedly control the above operations until the M pels of scaled image are formed.

BEST MOST OF CARRYING OUT THE INVENTION

Figure 1:
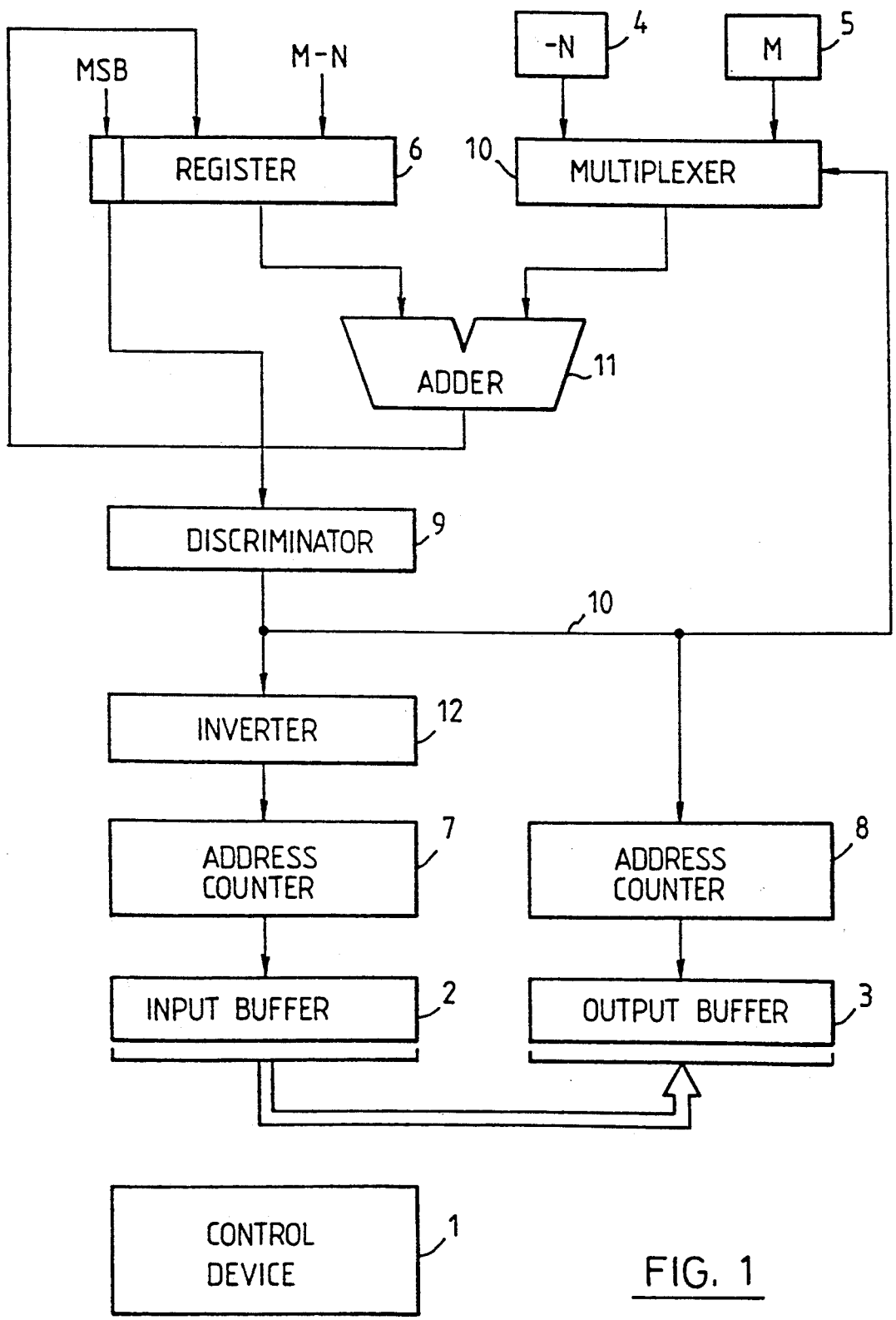
FIG. 1 is a block diagram of the apparatus of the present invention.

FIG. 1 shows a circuit diagram of an apparatus for converting N picture element (pels) of original image to M pels (N and M are integers larger than 0) in accordance with the algorithm of the present invention. A control device 1, such as a microprocessor, controls the operations of the blocks in FIG. 1. Actually, a large number of control lines for controlling the operations of the blocks are connected between the control device 1 and the other blocks. For simplifying the drawing, however, the control lines are not shown in the FIG. 1.

The apparatus shown in the FIG. 1 performs both the scale up operations and scale down operations of the image. The operations of the apparatus is described by using an example shown in FIG. 2, wherein 3 pels of the original image, i.e. $N=3$, are scaled up or enlarged to 5 pels, i.e. $M=5$. The 3 pel image has pel data "101," and the image is stored in an input buffer 2.

In an initial set up operations, the control device 1 resets an address counters 7 and 8 to the value 0, stores the value $-N$ ($-3$ in the example) in a register 4, stores the value M (5 in the example) in a register 5, and stores the initial sum value S (S is integer satisfying $-N \leq S < M$) in a register 6. Any value satisfying the relationship is used as the initial sum value S. Depending upon the value S, the bit pattern of the scaled image is changed a little, as described hereinafter. In the described embodiment, the value M-N is used as the initial sum value S, which satisfies the $-N \leq S < M$. Therefore, the value $M-N=2$ is stored in a register 6. The initial set up operations are shown by a block 31 in the FIG. 3.

The operations proceed to a block 32 in FIG. 1, and the control device 1 determines or checks whether the incremented addresses in the address counters 7 and 8 which point to addresses of the memory positions of the input buffer 2 and 3, respectively, exceed the addresses of last pel of the original image and output buffer the scaled image in the input and output buffers 7 and 8, or not. If the answer of the block 32 is YES, the operations proceed to a block 33 which terminates the scaling operations. If the answer is NO, the operation proceeds to a block 34, wherein a discriminator 9 in FIG. 1 determines or checks as to whether the sum value in the register 6 is negative, or not, under the control of the control device 1. The discriminator 9 checks the most significant bit (MSB) of the sum value stored in the register 6. If the sum value is not negative, the MSB is "0," and if the sum value is negative, the MSB is "1." If the sum value in the register 6 is not negative, the discriminator 9 generates the first signal indicating that the sum value is not negative on an output line 10. If the sum value in the register 6 is negative, the discriminator 9 generates the second signal indicating that the sum value is negative on the output line 10. If the answer of the block 34 is NO, the first signal is generated and the operations proceed to a block 35 in FIG. 3, wherein the pel data stored in the address of the input buffer 2 pointed by the address counter 7 is stored or moved into the address of the output buffer 3 pointed by the address counter 8, the update of the sum value in the register 6 by adding the value $-N$ to the sum value is made, and the address in the address counter 8 is incremented by $+1$. The increment of the address counters 7 and 8 is performed by the discriminator 9. The address counter 8 is incremented by the first signal, e.g. up level signal, while the address counter 7 is not incremented since the down level signal is supplied to the address counter 7 through the inverter 12. When the discriminator 9 generates the second signal, e.g. down level signal, the down level signal directly supplied to the address counter 8, so that the address counter 8 is not incremented, while the address counter 7 is supplied with the up level signal which is inverted by the inverter 12, so that the address counter 7 is incremented by $+1$.

The update operations are performed by the discriminator 9, a multiplexer 10, and an adder 11. If the sum value in the register 6 is not negative, the discriminator 9 supplies the first signal to the multiplexer 10, which supplies the value $-N$ in the register 4 to the adder 11. The adder 11 adds the value $-N$ to the sum value in the register 6, and the old sum value is replaced by the new or updated sum value calculated by the adder 11. The increment of the address counter 8 by $+1$ is also performed in the block 35. The control device 1 controls the operations of the block 35.

Figure 3:
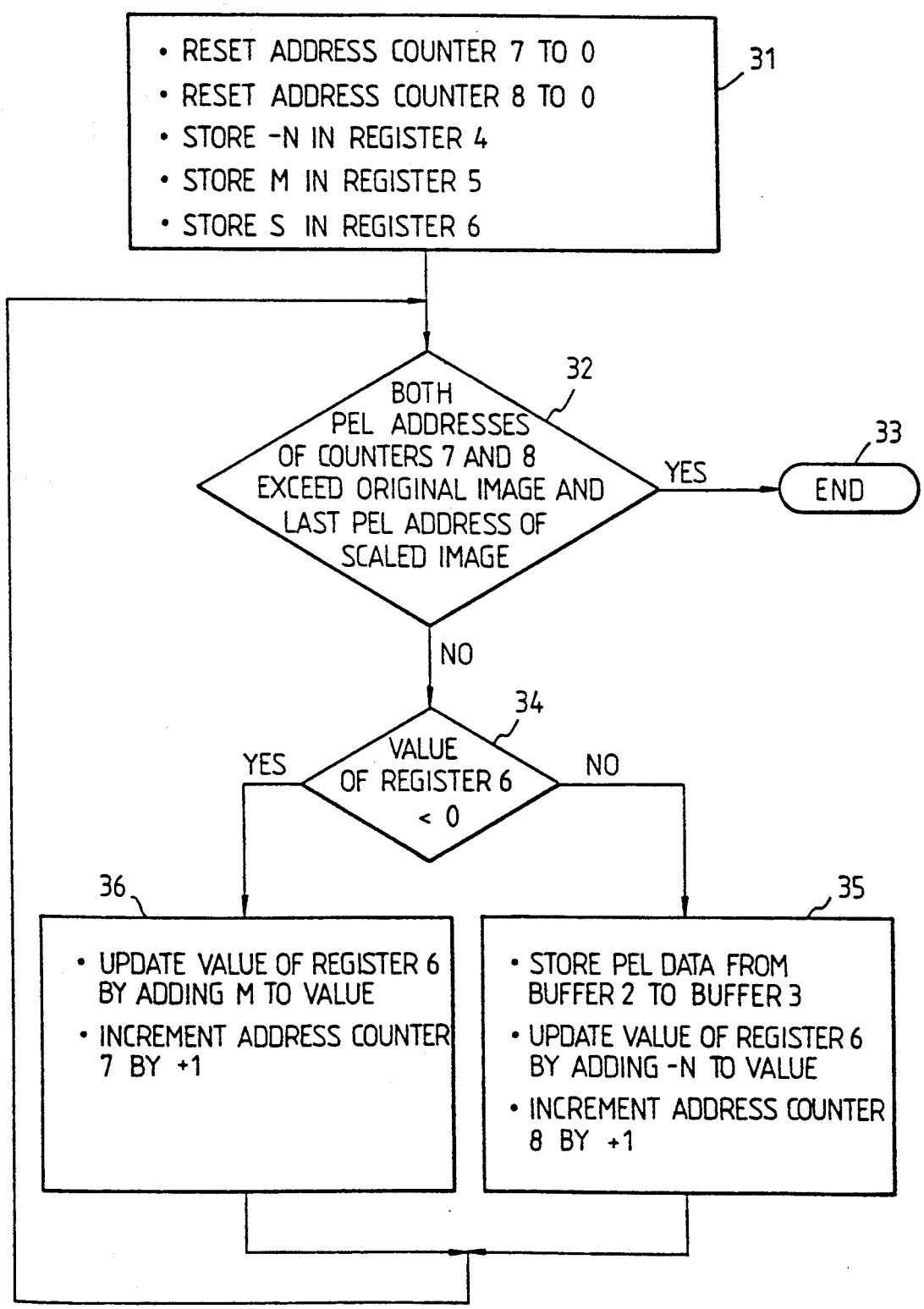
FIG. 3 is a flow chart of the method of the present invention.

If the answer of the block 34 is YES, the second signal is generated and the operations proceed to a block 36 in the FIG. 3, wherein the update of the sum value in the register 6 by adding the value M to the sum value is made, and the address in the address counter 7 is incremented by $+1$. To update the sum value in the register 6, the discriminator 9 supplies the second signal to the multiplexer 10, which gates the value M from the register 5 to the adder 11. The old value in the register 6 is replaced by the new sum value from the adder 11. The increment of the address counter 7 is also performed by the second signal.

The above operations of the blocks 32, 34, 35 and 36 are repeated as shown by the loop in FIG. 3, until the block 32 detects the end of scaling operations.

Figure 2:
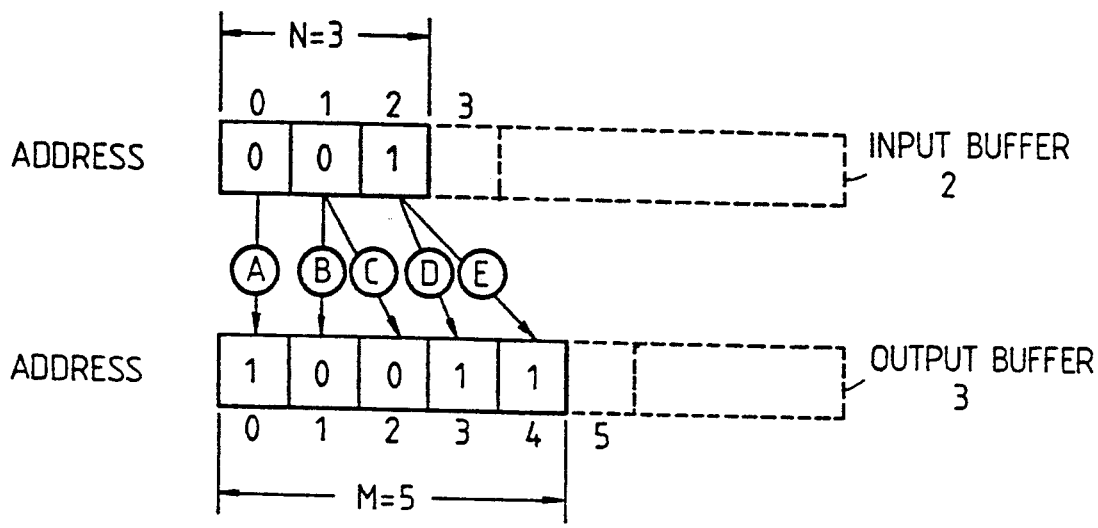
FIG. 2 is an example of the scaling up operations of the invention.

Next, actual operations are described, which scale up the pel data "101" of the three pel original image to the 5 pels, as shown in FIG. 2.

In the initial set up operations described hereinbefore, the control device 1 resets both the address counters 7 and 8 to the address value 0, whereby the address 0 (FIG. 2) of the input buffer 2 and the output buffer 3 is pointed. The control device 1 stores the value $-3$, i.e. $-N$, in the register 4, the value 5, i.e. M, in the register 5, and the value 2, i.e. $M-N$, in the register 6. The control device 1 also stores the pel data "101" in the input buffer 2, and resets the output buffer 3.

Next, the operations proceed to the block 32 in FIG. 3, and determination is made as to whether the current pel address 0 in the address counter 7 exceeds the last pel address 3 of the original image in the input buffer 2 and the current pel address 0 in the address counter 8 exceeds the last pel address 4 of the scaled up image in the output buffer 3. In this case, the answer of the block 32 is NO, the operations proceed to the block 34, wherein the determination is made as to whether the sum value 2 in the register 6 is negative, or not. In this case, the answer is NO, and the first signal is generated by the discriminator 9, and the operations proceed to the block 35, wherein the pel data or bit "1" in the address 0 of the input buffer 2, which is pointed by the address counter 7 is moved or stored into the address 0 in the output buffer 3 which is pointed by the address counter 8, as shown in FIG. 2. The first signal is supplied to the multiplexer 10 to gate the value $-3$ to the adder 11, which adds the value $-3$ to the old sum value 2 to generate new sum value $-1$ which is stored in the register 6 as the updated sum value. The first signal is also applied to the address counter 8 to increment its initial value 0 to the new address value 1.

Thus, the first pass operations from the block 32 to the block 35 has been completed, and the operations returns to the block 32 to initiate the second pass operations. The operations are repeated until the block 32, which checks whether the scaled image "10011" has been formed in the output buffer 3, generates the output YES. The following Table 1 shows the operations performed in the exemplary case for scaling up or enlarging the three pel image "101" to the five pel image "10011," as shown in FIG. 2.

TABLE 1

|  | Register 6 | Block 32 | Block 36 | Block 35 |
|---|---|---|---|---|
| Initial set up | 2 |  |  |  |
| 1st pass | 2 | No |  | Move pel, as shown by (A) Update Reg. 6 to ($-1$) Increment counter 8 to (1) |
| 2nd pass | $-1$ | No | Update Reg. 6 to (4) Increment counter 7 to (1) |  |
| 3rd pass | 4 | No |  | Move pel, as shown by (B) Update Reg. 6 to (1) |

TABLE 1-continued

| | Register 6 | Block 32 | Block 36 | Block 35 |
|---|---|---|---|---|
| | | | | Increment counter 8 to (2) |
| 4th pass | 1 | No | | Move pel, as shown by (C) Update Reg. 6 to (−2) Increment counter 8 to (3) |
| 5th pass | −2 | No | Update Reg. 6 to (3) Increment counter 7 to (2) | |
| 6th pass | 3 | No | | Move pel, as shown by (D) Update Reg. 6 to (0) Increment counter 8 to (4) |
| 7th pass | 0 | No | | Move pel, as shown by (E) Update Reg. 6 to (−3) Increment counter 8 to (5) |
| 8th pass | −3 | No | Update Reg. 6 to (2) Increment counter 7 to (3) | |
| 9th pass | 2 | Yes | | |

It is apparent that, in the first pass, the pel data or bit 1 at the address 0 in the input buffer 2 is moved to the address 0 in the output buffer 3; in the third pass and the fourth pass, the pel data or bit 0 at the address 1 in the input buffer 2 is moved to the addresses 1 and 2 in the output buffer 3; and in the sixth pass and seventh pass, the pel data or bit 1 at the address 2 in the input buffer 2 is moved to the addresses 3 and 4 in the output buffer 3, as shown in FIG. 2.

In the 9th pass, the count value of the address counter 7 is 3 which specifies the address 3 in the input buffer 2 shown in FIG. 2. It is apparent that the address 3 exceeds the last address, the address 2 in the case, of the original image in the input buffer 2. And, the count value of the address counter 8 is 5 which specifies the address 5 in the output buffer 3 shown in FIG. 2. It is apparent that the address 5 exceeds the last address, the address 4 in the case, of the scaled up image in the output buffer 3. Thus, the block 32 generates the answer YES to terminate the scale up operations.

Describing the selection of the initial sum value S, although the value 2 was used in the scaling up operations in Table 1, another value, such as −1, satisfying the relationship −N≦S<M could be used as the initial sum value. In the case of S=−1, the answer of the block 34 in the first pass operations is YES, and the operations of the block 36 is performed in the first pass operations, and, in accordance with the flow chart of FIG. 3, the succeeding operations, i.e. the second, third, fourth pass operations, etc. are performed, so that a different bit pattern from the bit pattern shown in the output buffer 3 in FIG. 2 could be generated. Thus, by using any initial sum value satisfying −N≦S<M, the scaled image of various bit patterns could be obtained.

Figure 5:
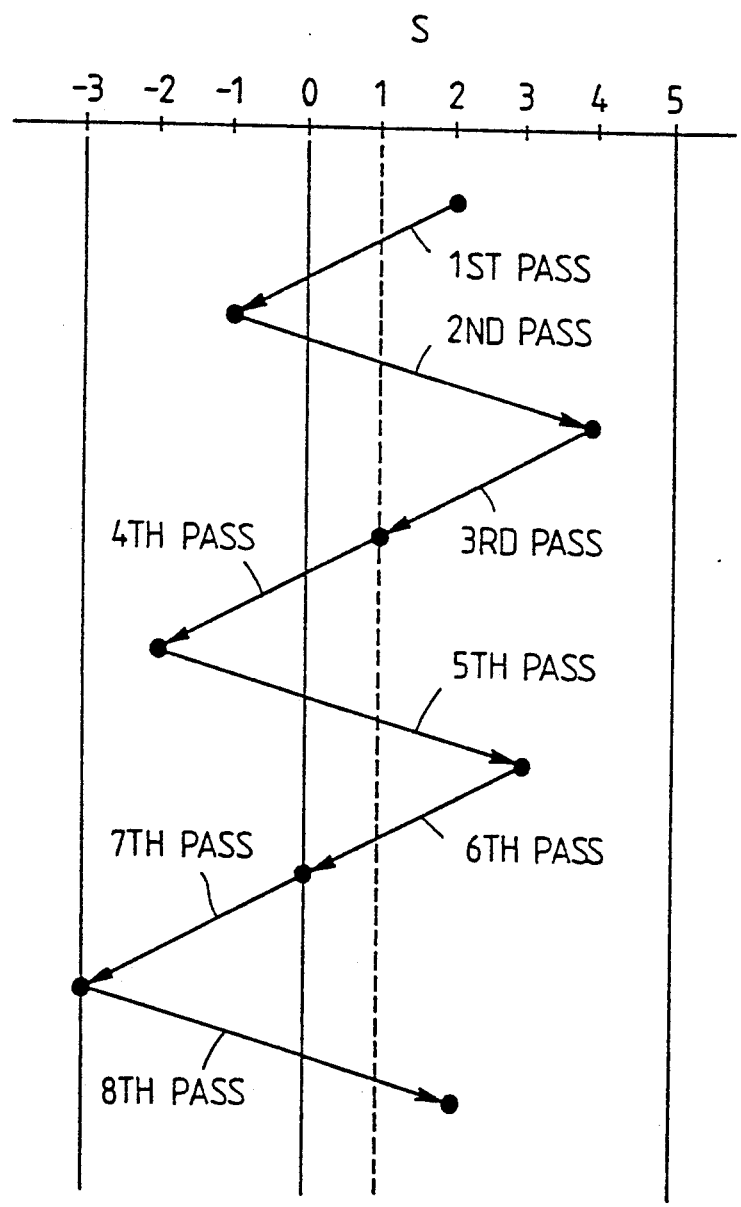
FIG. 5 is a graphical representation of the concepts of the present invention.

With reference to FIGS. 2 and 5 and the Table 1, the concept of the algorithm of the present invention is described. It is required to increment the pel address of the original image and the pel address of the scaled image to realize an ideal scaling up or enlargement operation with the ratio of 3:5. This requirement has been well known in the art. The invention discloses the following relationship shown by the equation (1) realizing the above ideal address increment.

$$a/b = N/M \qquad (1)$$

wherein:
  a: The number of increments of pel address of the original image
  b: The number of increments of pel address of the scaled image
  N: The number of pels of the original image
  M: The number of pels of the scaled image $$aM - bN = 0 \qquad (2)$$

The left side of the equation (2) represents the sum value S in the register 6, and the right side of the equation (2) represents that the sum value in the register 6 should approach to the center value, i.e. value 1, between the value −3 and the value 5 to prevent the sum value from exceeding the values −3 and 5, as shown in FIG. 5. The decision block 34 in FIG. 3 decide to approach the updated sum value in each pass operation to the value 1. Thus, the blocks 34, 35 and 36 in FIG. 3 realizes the ideal movement of the pel data from the input buffer 2 to the output buffer 3, and the ideal increment of addresses of the original image and the scaled image. That is, the ratio of the number of operations shown by the arrows directed to the left side, i.e. the first, third, fourth, sixth and seventh pass operations, to the number of operations shown by the arrows directed to the right side, i.e. the second, fifth and eighth operations is 5:3, which performs the ideal scaling up operations as shown in FIG. 2.

Figure 4:
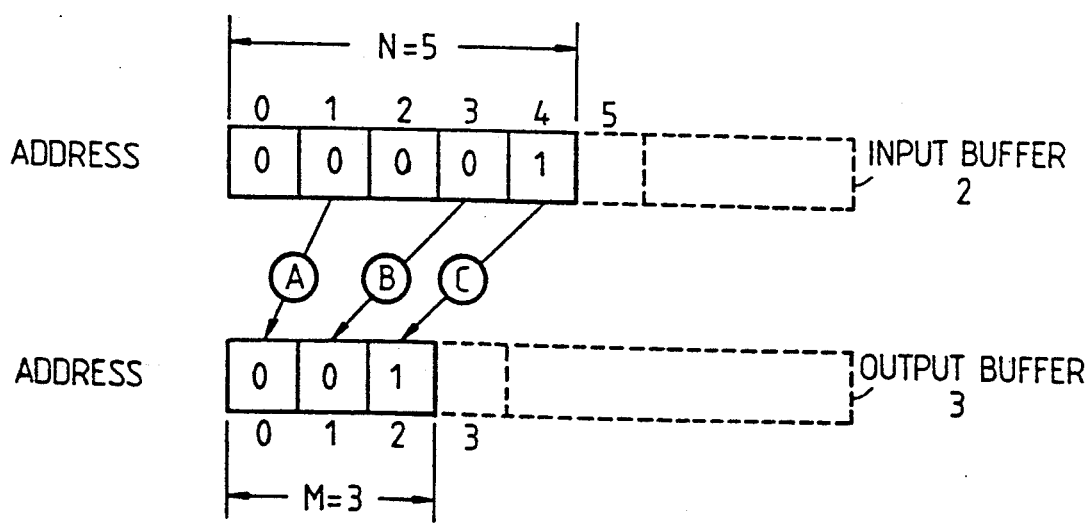
FIG. 4 is an example of the scaling down operations of the invention.

Next, actual operations are described, which scale down or reduce the pel data "00001" of the five pel original image to the three pel image, as shown in FIG. 4, with referring to the following Table 2.

TABLE 2

| | Register 6 | Block 32 | Block 36 | Block 35 |
|---|---|---|---|---|
| Initial set up | −2 | | | |
| 1st pass | −2 | No | Update Reg. 6 to (1) Increment counter 7 to (1) | |
| 2nd pass | 1 | No | | Move pel, as shown by (A) Update Reg. 6 to (−4) Increment counter 8 to (1) |
| 3rd pass | −4 | No | Update Reg. 6 to (−1) Increment counter 7 to (2) | |
| 4th pass | −1 | No | Update Reg. 6 to (2) Increment counter 7 to (3) | |
| 5th pass | 2 | No | | Move pel, as shown by (B) Update Reg. 6 to (−3) Increment counter 8 |

TABLE 2-continued

| | Register 6 | Block 32 | Block 36 | Block 35 |
|---|---|---|---|---|
| 6th pass | −3 | No | Update Reg. 6 to (0) Increment counter 7 to (4) | to (2) |
| 7th pass | 0 | No | | Move pel, as shown by (C) Update Reg. 6 to (−5) Increment counter 8 to (3) |
| 8th pass | −5 | No | Update Reg. 6 to (−2) Increment counter 7 to (5) | |
| 9th pass | −2 | Yes | | |

In the initial set up operations, the control device 1 resets both the address counters 7 and 8 to the address value 0, whereby the address 0 (FIG. 4) of the input buffer 2 and the output buffer 3 is pointed. The control device 1 stores the value −5, i.e. −N, in the register 4, the value 3, i.e. M, in the register 5, and the value −2, i.e. M−N, in the register 6. The control device 1 also stores the five pel data "00001" in the input buffer 2, and resets the output buffer 3.

Next, the operations proceed to the block 32 in FIG. 3, and the determination is made as to whether the current pel address 0 in the address counter 7 exceeds the last pel address 5 of the original image in the input buffer 2, and the current pel address 0 in the address counter 8 exceeds the last pel address 2 of the scaled image in the output buffer 3. The operations are shown as the first pass in Table 2. In this case, the answer of the block 32 is NO, the operation proceed to the block 34, wherein the determination is made whether the sum value −2 in the register 6 is negative, or not. In this case, the answer is YES, and the second signal is generated by the discriminator 9, and the operations proceed to the block 36, wherein the multiplexer 10 responding to the second signal gates the value 3 from the register 5 to the adder 11 which generates the new sum value 1, and the initial value −2 is replaced by the new value 1. The second signal, e.g. the down level signal is inverted by the inverter 12, and the up level signal is applied to the address counter 7, whereby the address counter 7 is incremented to the value 1.

The operations starting from the block 32 are repeated as the second pass, the third pass, ..., the ninth pass, as shown in Table 2.

In the ninth pass, the count value of the address counter 7 is 5 which points the address 5 in the input buffer 2 shown in FIG. 4. It is apparent that the address 5 exceeds the last pel address, the address 4 in the case, of the original image in the input buffer 2. And, the count value of the address counter 8 is 3 which points the address 3 in the output buffer 3 shown in FIG. 4. It is apparent that the address 3 exceeds the last pel address, the address 2 in the case, of the scaled up image in the output buffer 3. Thus, the block 32 generates the answer YES to terminate the scale down operations.

It is apparent that, in the second pass, the pel data or bit 0 at the address 1 in the input buffer 2 is moved to the address 0 in the output buffer 3; in the fifth pass, the pel data or bit 0 at the address 3 in the input buffer 2 is moved to the address 1 in the output buffer 3, and, in the seventh pass, the pel data or bit 1 at the address 4 in the input buffer 2 is moved to address 2 in the output buffer 3, as shown in the FIG. 4.

The Effects Of the Invention

The present invention realizes a high speed pel conversion which is comparable to the Bresenham's algorithm. The remarkable difference between the present invention and the Bresenham's algorithm is that the circuit shown in FIG. 1 operated in accordance with the algorithm of the present invention performs both the scaling up and scaling down operations, while two Bresenham's line generator are required to perform both the scaling up and down operations, i.e. one for the scaling up and the other for the scaling down, and the determination which one of the scaling up and scaling down operations is specified is required to select the line generator for the scaling up or the line generator for the scaling down. The present invention, therefore, reduces the cost of the hardware and improves the performance of the operations.

The reduction of the processing steps has been highly required in the image processing. As described with respect to the embodiment, the algorithm of the present invention requires minimum number of processing steps as shown in the FIG. 3, whereby the invention realized the high speed pel conversion.

Having thus described my invention, what I claim as new, and desire to secure by Letters Patent is:

1. An apparatus for converting N picture elements (pels) of an image to an M pel scaled representation of said image, where N and M are each integers greater than 0, the combination comprising:
   a first register for storing −N;
   a second register for storing M;
   a third register for storing a sum (S), wherein initially S=M−N;
   a discriminator, which is responsive to S, for generating a first signal when S is not negative, and for generating a second signal when S is negative;
   an adder for adding the value of S stored in said third register with −N in response to said first signal, and for adding the value of S stored in said first signal, and for adding the value of S stored in said third register with M in response to said signal, for in each instance providing a new S for storage in said third register;
   a first address counter which is incremented by said first signal;
   a second address counter which is incremented by said second signal;
   an input buffer including N member positions for storing N pels of said image;
   an output buffer including M memory positions, with each of said M memory positions initially being set to 0; and
   means responsive to said first signal and to incremented count of said first address counter and to incremented count of said second address counter and for transferring at least one of said N pels from said input buffer to at least one of said M pel positions of said output buffer to form said M pel scaled representation of said image.

2. An apparatus for converging N picture elements (pels) of an image to an M pel scaled representation of said image, where N and M are each integers greater than 0, the combination comprising:
   a first register for storing −N;

a second register for storing M;

a third register for storing a sum (S), wherein initially $S=M-N$;

a discriminator, which is responsive to S, for generating a first signal when S is not negative, and for generating a second signal when S is negative;

an adder for adding the value of S stored in said third register with $=N$ in response to said first signal, and for adding the value of S stored in said first signal, and for adding the value of S stored in said third register with M in response to said signal, for in each instance providing a new S for storage in said third register;

an input buffer including N memory positions for storing N pels of said image;

an output buffer including M memory positions, with each of said M memory positions initially being set to 0;

a first address counter which is incremented by said first signal to point at a given addressed memory position of said input buffer in response to being incremented;

a second address counter which is incremented by said second signal to point at a given addressed memory position of said output buffer in response to being incremented; and means responsive to said first signal to store said pel data, from an address memory position of said input buffer pointed to by said second address counter, to an addressed memory position of said output buffer pointed to by said first address counter.

* * * * *